United States Patent [19]

Curl et al.

[11] Patent Number: 4,592,090

[45] Date of Patent: May 27, 1986

[54] APPARATUS FOR SCANNING A SHEET

[75] Inventors: Barry J. Curl, Durley; Victor B. Chapman, Clanfield, both of England

[73] Assignee: De La Rue Systems Limited, London, England

[21] Appl. No.: 742,135

[22] Filed: Jun. 7, 1985

Related U.S. Application Data

[63] Continuation of Ser. No. 406,836, Aug. 10, 1982, abandoned.

[30] Foreign Application Priority Data

Aug. 11, 1981 [GB] United Kingdom ................ 8124501
Nov. 4, 1981 [GB] United Kingdom ................ 8133280

[51] Int. Cl.[4] ............................................. G06K 9/60

[52] U.S. Cl. ....................................... 382/7; 209/534; 250/226; 250/227; 250/556; 356/71; 382/67

[58] Field of Search .................... 382/7, 3, 34, 47, 67; 250/226, 227, 556, 559, 571; 356/71; 364/146.2; 209/534

[56] References Cited

U.S. PATENT DOCUMENTS

| | | | |
|---|---|---|---|
| 2,951,164 | 8/1960 | Timms | 250/556 |
| 3,289,164 | 11/1966 | Rabinow | 382/47 |
| 3,360,653 | 12/1967 | Phares | 250/556 |
| 3,679,314 | 7/1972 | Mustert | 250/556 |
| 3,942,154 | 3/1976 | Akami et al. | 250/226 |
| 4,041,456 | 8/1977 | Ott et al. | 382/7 |
| 4,086,567 | 4/1978 | Crane et al. | 382/3 |
| 4,153,896 | 5/1979 | White | 382/47 |
| 4,343,991 | 8/1982 | Fujiwara et al. | 250/227 |
| 4,386,432 | 5/1983 | Nakamura et al. | 382/7 |
| 4,435,834 | 3/1984 | Pauli et al. | 382/67 |
| 4,542,829 | 9/1985 | Emery et al. | 382/7 |

FOREIGN PATENT DOCUMENTS 2078368 1/1982 United Kingdom .

*Primary Examiner*—Leo H. Boudreau
*Attorney, Agent, or Firm*—Sughrue, Mion, Zinn, Macpeak and Seas

[57] ABSTRACT

Apparatus is disclosed for scanning a banknote (33). A lengthwise strip of the banknote (33) is illuminated with white light, and the banknote is moved parallel to its width. Light reflected from all regions of the lengthwise strip is conveyed through an optical fibre fishtail array to a single photodetector, or to a spectroscope and then to several photodetectors for color scanning. The waveform produced by the or each photodetector is then characteristic of the surface of the banknote, and is used in an analyzing circuit for banknote pattern recognition, or to sense the condition of the banknote with regard to its age or degree of soiling. The analyzing circuit includes means for compressing or expanding the length of the waveform to give it a standard length for subsequent comparison with one or more stored characteristic waveforms in a memory (16). The apparatus also determines the mean level of intensity of the waveform in an integrator (9), and includes a circuit (24 to 28) for obtaining the standard deviation of selected points of the waveform from the mean value, a low standard deviation indicating a badly soiled or worn banknote.

11 Claims, 4 Drawing Figures

APPARATUS FOR SCANNING A SHEET

This is a continuation, of application Ser. No. 406,836, filed Aug. 10, 1982, now abandoned.

The present invention relates to optical apparatus for scanning a sheet, and is particularly useful for analysing the surfaces of banknotes. The apparatus may respond to the overall condition of the note, for example the degree of soiling of the note, or it may be used for pattern recognition; for example to sort banknotes in accordance with their orientation and their denomination or Bank of Origin.

We have previously proposed apparatus for scanning banknotes, to analyse their condition or to recognise patterns on their surface, including a plurality of discrete detectors arranged across the banknote. Signals from each of the detectors are processed independently until the final stages of analysis in which some comparison may be made between the levels of intensity from each detector. For the purpose of banknote pattern recognition this approach has several significant disadvantages:

(i) sensitivity to lateral displacement of banknotes with respect to the detector head;

(ii) sensitivity to printing variations, such as: the misregister of one layer of print with respect to another (the printing of a banknote normally involves several separate printing processes); and the misregister of the whole pattern with respect to the edges of a banknote.

In order to identify banknotes reliably the multidetector system usually employs a high resolution, i.e. the pixel size is small. The disadvantage of using a small pixel size is that a great deal of information is obtained for each banknote scanned and if the data processing time is to be kept within useful limits the processing must be accomplished in a highly sophisticated manner. It is difficult to process the data in the time available betwen banknotes, when scanning at the rate of 20–30 notes per second (a common speed for banknote transport systems), with presently available digital processing systems. It is also very expensive. It is therefore an object of the present invention to provide a simple form of apparatus for scanning a sheet in which a waveform characteristic of the surface of the sheet may be produced easily, even if the sheet is worn or soiled.

Apparatus according to the invention for scanning a sheet comprises: means for illuminating the sheet; means for collecting light from an illuminated strip of the sheet; means responsive to the light collected from all regions of the strip to produce a summed intensity signal; means for moving the sheet relative to the light collector in a direction substantially perpendicular to the strip; and analysing means responsive to successive summed intensity signals to create a waveform which is characteristic of the surface of the sheet. The means responsive to the collected light is preferably a single photodetector, and the means for collecting light from the strip is preferably a fibre optic fishtail array, the wide end of which is arranged adjacent to the strip, and the narrow end of which delivers light to the photodetector. The sheet is preferably illuminated with white light, the means responsive to collected light having a spectral response similar to that of the human eye. The means for illuminating the strip may also be a fibre optic fishtail array, with a source of white light or blue-white light positioned next to the narrow end of the fishtail array, and the wide end of the fishtail arranged adjacent to the said strip so that light will be reflected in the strip and reach the photodetector.

In the preferred embodiment of the invention for scanning banknotes, a lengthwise strip of the banknote surface is illuminated, and the banknote is moved in a direction parallel to its width. The apparatus may be arranged to illuminate a strip that is longer than the length of the banknote, with light from the whole of this length being delivered to the photodetector, in order that variations in the position of the banknote, in a direction perpendicular to the scanning direction, as it passes the scanning apparatus do not affect the waveform produced. This system is also insensitive to any printing registration errors in a direction along the strip of the banknote. In an alternative arrangement, the illuminated strip is in the centre of the sheet, so that a central band of the sheet is scanned by the scanner. Then the same band of the sheet is scanned no matter which way around the sheet is fed into the apparatus. The waveform is simply reversed for opposite orientations of the sheet. The sheet may, however, be scanned by two strip scanners arranged across the sheet, so that two parallel bands of the sheet are scanned. These bands are preferably of equal width and are equidistant from the centre of the sheet, so that changing the orientation of the sheet simply results in the same two bands being scanned in reverse, resulting in the waveforms from the two strip scanners being interchanged and reversed. In this form of the apparatus, a memory is provided to store each waveform from each of the scanners.

The preferred apparatus incorporates a memory for storing the characteristic waveform of a sheet for subsequent comparison with another sheet. The apparatus then works in two alternative modes, the first mode being for recording the waveform in the memory, and the second mode being for comparing a currently-produced waveform with a stored waveform. Different waveforms are produced depending on the two possible orientations of a sheet as it passes the scanner. It is a preferred additional feature that when in the compare mode the apparatus should make a simultaneous comparison of the currently-produced waveform with a reversed stored waveform. The waveform is therefore compared with two waveforms, corresponding to the two possible orientations of the sheet.

The waveform produced by this apparatus as a function of time depends on the width of the sheet being scanned, given that the speed of a scan is constant. In the case of banknotes, for example, a sheet that is skewed as it enters the scanning apparatus would produce a slightly longer wavefore, which, when compared with a stored waveform characteristic of the same type of banknote, would fail to correlate. This failure would also occur for banknotes which are slightly stretched or shrunken. It is a preferred feature of the invention to compensate for the different lengths of waveforms produced in the apparatus, by a circuit which measures the length of the waveform and either compresses or expands the waveform until it has a standard length.

A further aspect of the invention is in the provision of a circuit for determining the mean level of the said successive summed intensity signals, and comparing each successive summed intensity signal with the said mean level. The differences between the signal level and the mean level are preferably squared, summed, and then square-rooted, so as to provide a signal representing the standard deviation of the successive summed intensity signals from the mean. This standard deviation signal is directly related to the age and the degree of soiling of the material of the sheet, the standard deviation being lowest for sheets having the poorest condition.

The apparatus for scanning a sheet preferably produces a large number of successive summed intensity signals during the scan. These signals may be all in respect of light of the same spectrum, but a refinement of the apparatus is possible by using a colour detector.

Such colour detection apparatus comprises: means for illuminating the sheet; means for collecting light from an illuminated strip of the sheet; means responsive to the light collected from all regions of the strip to provide a set of colour intensity signals, each representative of the intensity of a different group of wavelengths of the collected light; means for moving the sheet relative to the light collector in a direction substantially perpendicular to the strip; and analysing means responsive to successive summed colour intensity signals to create waveforms for each colour, the waveforms being characteristic of the surface of the sheet. The apparatus preferably incorporates a memory for storing the characteristic colour waveforms of a sheet for subsequent comparison with respective waveforms of another sheet, as has been described above for single colour comparison. The apparatus then works in two alternative modes, the first mode being for recording the waveforms in the memory, and the second mode being for comparing currently-produced waveforms with stored waveforms, to determine the stored waveform which produces the best match. As before, each waveform is preferably compared with two stored waveforms, corresponding to the two possible orientations of the sheet.

This colour detection apparatus may for example comprise a plurality of photodetectors responsive to the different wavelengths of light, each photodetector arranged to receive light from the said collecting means. Successive summed intensity signals are preferably taken from each photodetector in rotation, so that the summed intensity for any given wavelength is sampled periodically during the scan. the preferred form of apparatus including such a colour detector head, eight wavelengths are monitored sixteen times during each scan across a banknote, the total number of successive summed intensity signals being 128. It is preferable to normalize the length of the characteristic waveform of each colour separately, to ensure that regions of a scanned banknote are compared with corresponding regions of a standard banknote, on the b of the same group of wavelengths.

In order that the invention may be better understood, two preferred embodiments of the invention are described below with reference to the accompanying drawings, wherein.

Figure 1:
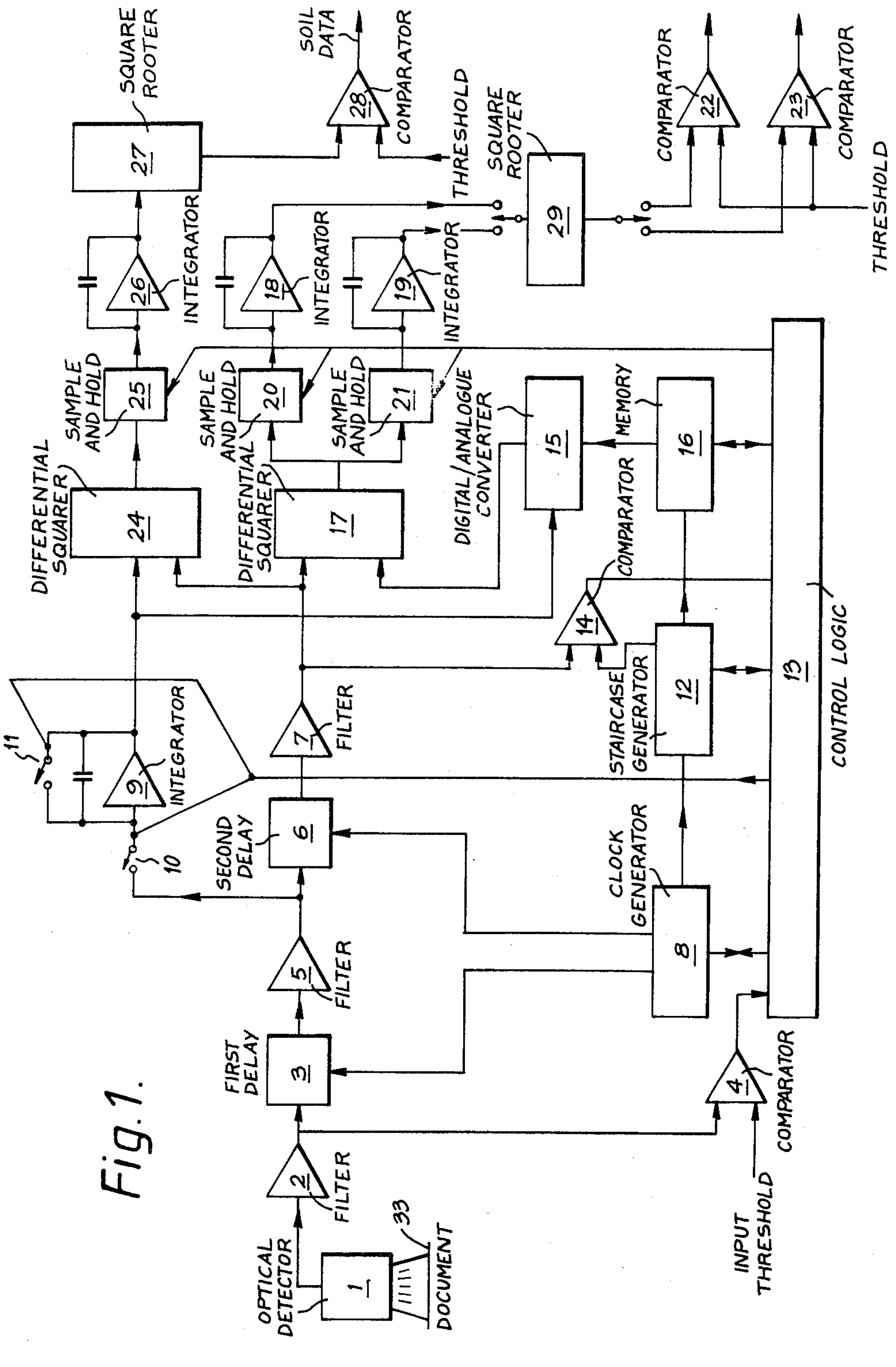
FIG. 1 is a block circuit diagram of apparatus according to an embodiment of the invention for recognising the characteristic pattern on the surface of a banknote and for detecting the age and/or degree of soiling of the banknote.

A banknote 33, FIG. 1, is illuminated with white light or blue-white light from an array of optical fibre bundles and light reflected from the surface is collected by an array of receiving fibre bundles. Visible light is used when this apparatus is used in conjunction with a soil detection system, because it has been found that this gives the most reliable results, particularly when banknotes are soiled with a yellow colour. In this respect, the optical detector simulates a human sorter who works in daylight or fluorescent light. An optical fibre fishtail array is particularly useful both for illuminating a strip of the banknote and for collecting light reflected from the same strip. Two such fishtail arrays are used in the present embodiment. An optical fibre fishtail array consists of a group of adjacent bundles of fibres, the bundles being bunched together to have a common light input at one end, the bundles fanning out so that the other ends of the bundles are spaced in a regular linear array. A single detector or light source at the narrow end of the group thus communicates with each end of respective optical fibre bundles.

In the preferred embodiment of the invention the receiving fibre optic fishtail is arranged to collect light diffusely reflected from the banknote surface. The system is then largely insensitive to the presence of shiny transparent tape on banknotes.

The banknote 33 to be scanned is mounted on a rotating drum. The detector head includes a lamp, a first optical fibre fishtail array for directing light onto a strip of the surface of the banknote 33, and a second optical fibre fishtail array for collecting light reflected from the surface and for conveying it to photodetector.

FIG. 1 is a block circuit diagram of apparatus according to a first embodiment of the invention. It incorporates a detector head 1 arranged over the path of a banknote 33. Successive summed intensity waveforms from lengthwise strips of the banknote 33 are fed through a filter 2 to a first delay 3 and a comparator 4. A clock generator and counter 8 controlled by control logic 13 causes the waveform represented by successive signals from the filter 2 to be clocked into the first delay 3. The comparator 4 compares the waveform from filter 2 with an input threshold level in order to determine the beginning and the end of the waveform representing the banknote 33. The output of the comparator 4 is fed into the control logic 13 which in turn controls the clock generator and counter 8. In this way, the clock generator 8 responds to the length of the waveform to adjust the clock frequency accordingly so that the waveforms is clocked into a second delay 6 via another filter 5 at a greater or lesser frequency. All waveforms clocked into the second delay 6 are adjusted to be of the same standard length. This compensation for length may be achieved as follows. Suppose that the first and second delays 3, 6 both have a capacity of $N_T$ bits, and that the length of the waveform is such as to occupy only the first $N_W$ bits in the first delay 3 (the size $N_T$ of the delays is designed so that for all input waveform lengths $N_W \leqq N_T$). The waveform is then expanded so that it fills exactly all $N_T$ bits of the second delay 6, and is thus expanded into a standard length.

While the waveform was clocked into the first delay, at a frequency $f_o$, the $N_W$ bits were counted and stored in a register. This information determines the ratio between the frequencies of clocking out from the first delay 3 and clocking in to the second delay 6. The waveform is clocked out of the first delay at a frequency $f_1$ while the stored digital number is loaded into a down counter in the clock generator and counter 8. The down counter is reduced to a zero count by counting at a higher frequency $f_2$, and produces a single pulse on reaching zero. This occurs each time it is required to clock the waveform portion into the second delay 6, so the single pulse is a clocking pulse for loading the expanded waveform into the second delay 6, at a clocking frequency of $F_2 \div N_W$. On producing the single pulse, the number $N_W$ is reloaded into the down counter, and the process is repeated, so as to provide a regular series of single pulses for clocking the second delay 6, until it is full with $N_T$ bits.

The time taken to fill the second delay 6 is equal to the number of bits, $N_T$, divided by the clocking frequency, and is therefore equal to $$\frac{N_W}{f_2} \times N_T.$$

The numer of bits read out from the first delay 3 in this time is then:

$$\frac{N_W}{f_2} \times N_T \times f_1$$

which should of course be equal to $N_W$. For this to be true, $f_2$ must be made equal to $f_1 \times N_T$, regardless of the waveform.

Waveforms emerging from the first delay 3 and the second delay 6 are filtered by filters 5 and 7 respectively, to remove clock frequency components.

Each delay unit comprises a series of analogue stores and processes the analogue signals by sampling the voltage present at the input and clocking this value into the first analogue store and thence from store to store until the final store.

Figure 2:
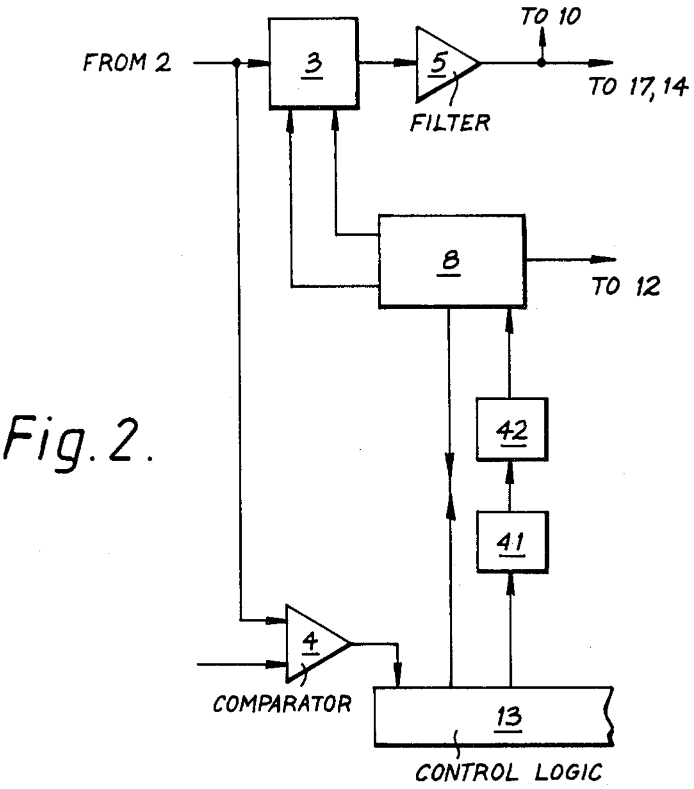
FIG. 2 is a block diagram of a different waveform length normalizing section which could be used in the circuit of FIG. 1 as an alternative.

In an alternative circuit of which the length normalization unit is shown in FIG. 2, the first and second delays have been replaced by a single delay 3, with its associated filter 5 for removing the clock pulses from the signal. The clock generator clocks the waveform into the delay, and the comparator 4 and control logic 13 determine the length of the waveform as for the circuit of FIG. 1. The waveform is clocked in to the delay 3 at a fixed rate, but is clocked out, and processed simultaneously by the remainder of the circuit, at a variable rate. The variable clocking out rate is determined by means of a voltage-to-frequency converter 42 which is fed by the voltage from a digital-to-analogue converter 41 responsive to a signal from the control logic 13 representing the length of the waveform. The following description applies equally to both the FIG. 1 and the FIG. 2 circuits.

The section of the circuit responsible for determining the age and/or degree of soiling of the banknote is to be found at the top and right-hand corner of FIG. 1. The mean value of the waveform is determined by an integrator 9 which is operated by the control logic 13. A predetermined portion of the waveform is integrated under the control of the control logic 13 which operates switches 10 and 11. Switch 10 connects the integrator 9 to receive the signal from the filter 5, and switch 11 operates to reset the integrator to zero. The further operation of this part of the circuit will be described below.

The normalised waveform, with the standard length, emerges from the filter 7 (FIG. 1) or filter 5 (FIG. 2). When the apparatus is in "record" mode, this output is recorded in a memory 16 in digital form. Recording is achieved by means of a staircase generator 12 and a comparator 14. Comparator 14 compares the normalised waveform with successively larger levels of potential produced by the staircase generator 12 under control by the clock generator 8 and control logic 13. The output of comparator 14 is thus in digital form, and represents successive levels of the waveform. In this example, the digitisation is performed 128 times during the passing of the waveform, but smaller or larger numbers can be adopted for different applications.

With the apparatus in the "comparison" mode, the normalised waveform from the filter 7 is compared with the waveform stored in the memory 16, the latter having been converted into analogue form in a digital-to-analogue converter 15. The overall level of the waveform from a subsequent banknote may be higher than the overall level stored in the memory, even though the characteristics of the waveforms are identical. It is therefore preferable to compensate for any overall differences in level. This can be achieved in the circuit of FIG. 1 by controlling the output of the digital-to-analogue converter 15 in accordance with the mean value of the waveform derived by the integrator 9. If the current mean value of the integrator 9 is higher than normal, then the signals derived from memory 16 should be correspondingly increased in level. Alternatively, of course, the waveform from the filter (5 or 7) could be reduced in level. A fair comparison of the current and stored waveforms is made in a differential squarer 17. The difference is squared, and the output from the differential squarer 17 is fed into a sample-and-hold unit 20. The waveform of the banknote currently being scanned should also ideally be compared with the reverse of the stored waveform in memory 16. It will then not matter whether the banknote is orientated in one way or the other. To achieve this, the signal from the digital-to-analogue converter 15 alternates between the value corresponding to the true memory address and the value corresponding to the inverted memory address. The output of the differential squarer 17 therefore alternates between the true comparison and the reverse comparison, and the output is summed alternately by sample-and-hold units 20 and 21, under the control logic 13. Sample-and-hold units 20, 21 are switched alternately accordin9 to whether the true or inverted memory address is chosen. By completely filling a memory device, the inverted address of the portion of the waveform at the opposite end is determined easily, simply by subtracting the true address from the size of the memory. In binary, this may simply be the equivalent of changing the sign of the address, i.e. inverting the binary address number. In an eight bit memory, for example, an address 010 would be inverted to 101. The outputs of these sample-and-hold units 20, 21 are integrated in integrators 18, 19 respectively, so as to produce a signal representing the sum of the squares of the differences between the current waveform and the stored waveform. A square-rooting device 29 is switched in unison with these two outputs and the output of the square-rooting device is fed to two comparators 22, 23 alternately. These comparators 22, 23 produce outputs according to whether the true or inverted waveforms respectively agree with the stored waveform within a tolerance level fixed by a preset threshold signal. Generally, of course, one of these outputs will exceed the threshold level and the other will be below it. These output signals are then used by external apparatus (not shown) to route the banknote according to its orientation and/or its pattern.

To return now to the section of the circuit responsible for determining the age and/or degree of soiling of the banknote, the output from the integrator 9 representing the mean value is compared with the output of the filter 7 (FIG. 1) or filter 5 (FIG. 2) representing the normalised waveform. This comparison is made in another differential squarer 24 at each of the 128 scanning points. The difference is squared, sampled in a sample-and-hold unit 25, integrated in an integrator 26 and then square-rooted in a unit 27 before being compared in a further comparator 28 with a predetermined threshold. The output from the square-rooter unit 27 is indicative of the standard deviation of the waveform from the mean level. A large standard deviation indicates a new banknote with very little soiling. The output of the final comparator 28 is used to route the banknote in accordance with its age and/or its degree of soiling.

As an extension of the system, items 15 to 23 and 29 of the diagram of FIG. 1 can be duplicated, together with their control logic circuitry, so that the system can be programmed to recognise any one of a number of different document patterns, as stored in different memories 16. This pattern recognition can be conducted simultaneously. In this way it is possible to compare a banknote simultaneously with a number of possible banknotes, for example. By comparing the outputs from all of the integrators 18, 19 and deciding which one exhibits the lowest value, the stored pattern matching the input waveform most closely can be chosen, and the banknote can be routed accordingly.

Figure 3:
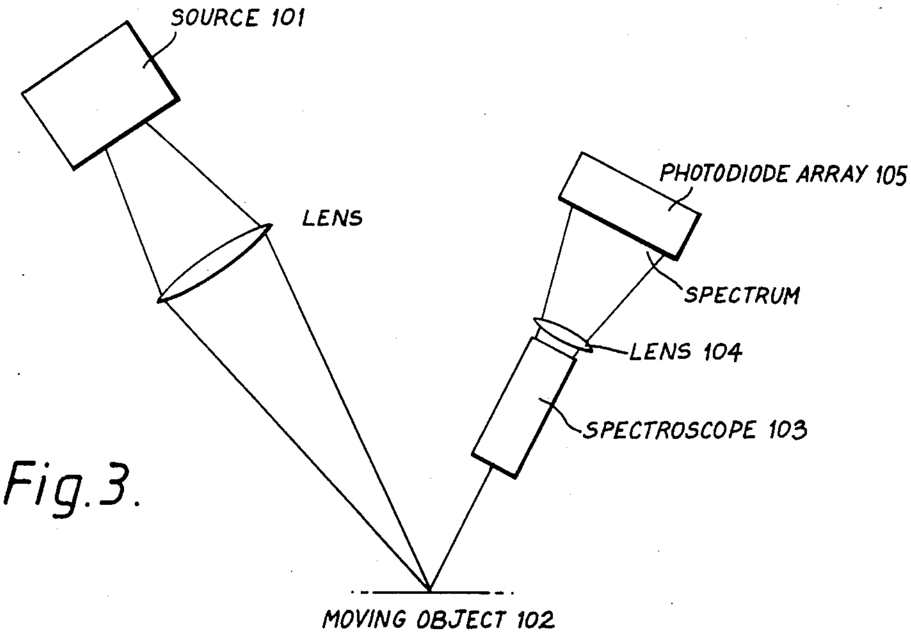
FIG. 3 is a sketch of the detecting head layout of a colour pattern scanner in accordance with another preferred embodiment.
Figure 4:
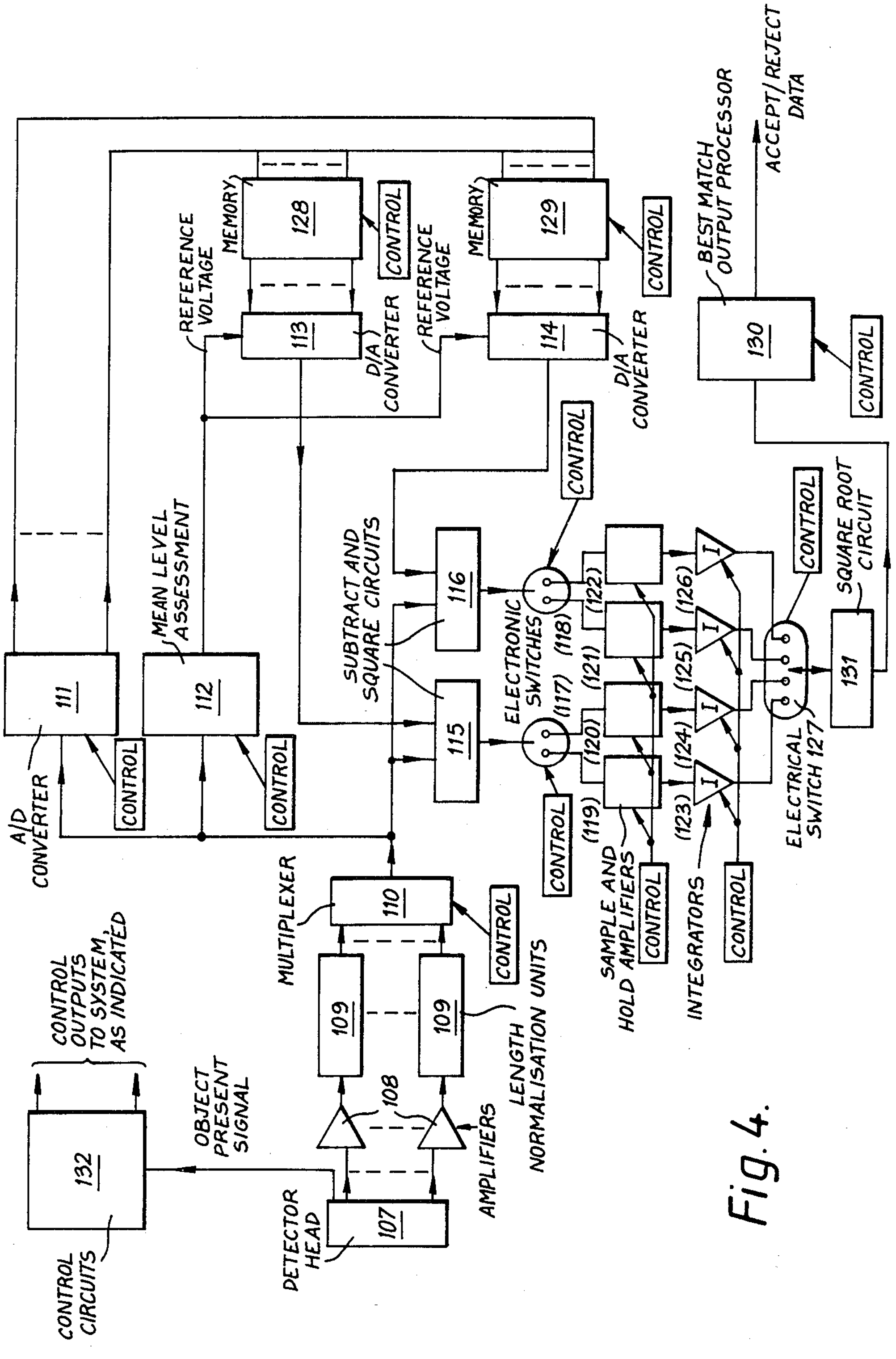
FIG. 4 is a block diagram of the detecting and analysing section of the apparatus of the other embodiment.

FIGS. 3 and 4 show a second embodiment of the invention in which the apparatus is refined by separately analysing light of different wavelengths. A detector head is provided with one photodetector for each of the wavelengths required, each photodetector receiving light from the same optical fibre fishtail array. Using this colour detector head, with for example eight photodetectors corresponding to eight different wavelengths of light, each wavelength can be monitored sixteen times with a 128 scan system. Each colour is then compared with a corresponding value in the memory, for a number of discrete areas scanned sequentially as the note passes.

The layout of the detector head is shown in FIG. 3. Light from a wide band source 101 is focused on to the moving banknote 102. The reflected light is passed through a spectroscope 103 and lens 104 which splits the light into a spectrum. The spectrum falls onto the photodetectors which constitute a photodiode array 105, or similar detecting means, so that each detecting element of the array measures the intensity of light at a selected group of wavelengths. The output of each of these detecting elements is transmitted along a separate channel to respective amplifier 108 (FIG. 4).

FIG. 4 shows a signal processing unit which responds to the colour signals and diverts the detected banknote in accordance with a correlation of its colour pattern with two or more stored colour patterns. This circuit is very similar to the circuit of FIG. 1 with the exception that there are several channels from the detector head, one for each colour, and that the single memory 16 is replaced by two (or more) memories 128, 129 for a corresponding number of banknote patterns. Each length normalization unit 109 includes one or two delays which are controlled in the manner described above. The soil detection section (9, 10, 11, 24–28 FIG. 1) has not been included in the circuit of FIG. 4, but it could be incorporated. A control circuit 132 responds to a signal from the detector head 107 indicative of the presence of a banknote, and controls several other elements of the circuit, as indicated in the figure by "control" inputs. The amplifiers 108 for each colour channel provide colour intensity signal outputs to length normalisation units 109 of which there is one per channel, each functioning in the manner described above with reference to the analogue delay or delays 3, 6 (FIG. 1 or FIG. 2).

In a first mode of operation of the apparatus, successive signals from each colour channel are stored in the memory 128 or 129. The memory therefore stores a measurement of the colour spectrum at each successive scanned point. In a second mode, the apparatus responds to colour signals from a target banknote to correlate the signals units, in order to determine the best match.

The size of the strip which is scanned can be varied to only a small degree in the direction of movement of the banknote, since it is not usually of advantage to allow successive strips to overlap, but the width of the strip (in a direction at right-angles to the direction of movement) is variable up to or in excess of, the length of the banknote. If the area monitored is greater than the length of the banknote, then any movement of the banknote at right-angles to the scan motion does not affect the measurement made, since the detector always indicates the colour characteristics across the area monitored.

As described above, it is possible to detect banknotes fed through the system in either orientation, by comparing the waveform with a reversed standard waveform as well as with the standard waveform. Where there is only one scanned strip, the detector head must be placed centrally over the banknote. It is necessary to normalise the length of the waveforms from the banknote in order that the pattern reversal is achieved simply. There may alternatively be two detector heads monitoring the banknote along lines equidistant from the central line of the banknote in the direction of motion. The signals from the sample banknote obtained from the two detectors can either be compared with a single stored standard representing the colour pattern on one selected side, with reversal as explained above where necessary and a match from either detector looked for, or else the signals from the two heads can each be compared with two standards representing the pattern on each side of the banknote, with reversals as appropriate, and a match against either pattern looked for on both detectors.

The memory units 128, 129 store the pattern for two standard banknotes. The length normalisation circuits 109 ensure that the lengths monitored are the same on each banknote, and that the memory addresses in the memory units 128, 129 are completely filled for all banknotes, so that reversal of the pattern can be achieved simply by inverting the memory addresses.

Signals from the different amplifiers 108 for different colours may be monitored simultaneously, so that each strip is scanned for all the colours. In this case, the characteristic waveforms produced in each colour channel may be expanded or contracted by the same factor. It is preferable, however, to monitor colour signals sequentially, so that a different strip of the banknote is scanned for each colour, the signals from the amplifiers 108 being sampled cyclically as the banknote is scanned along its width. In this case, banknotes of different widths which are otherwise identical would not necessarily produce characteristic waveforms which matched for all the colours, if the same expansion factor were applied for all the colours in the normalization process. This is because the total number of samples from any banknote may be different for different colours. The scan may start always with one particular colour, but the last colour scanned depends on the length of the pattern on the banknote. In this case, therefore, the normalization must be made separately for each colour channel. This ensures that regions of a scanned banknote are compared with corresponding regions of a standard banknote, on the basis of the same group of wavelengths.

The various colour channels are multiplexed in a multiplexer unit 110 and fed to an analogue-to-digital converter 111, when the apparatus is being operated in the first mode (for storing the standard patterns). When a standard pattern is being recorded in this way, the output from the converter unit 111, consisting of a number of lines of digital information, is written into one of the two memories 128, 129.

In the comparison mode, the outputs from the memories 128, 129 are reconverted into analogue form by the converters 113, 114 and subtracted from the sample colour waveforms from the multiplexer unit 110 by the subtract and squaring circuits 115, 116. The colour signals from the multiplexer unit 110 are also fed to a mean level assessment unit 112 to provide a reference voltage indicative of the mean intensity level of each colour. This mean level is used to adjust the outputs from the memory to such a level whereby a fair comparison can be made with the incoming colour signals from the multiplexer unit 110. Any differences in intensity which affect the whole spectrum are compensated for by this method.

The outputs from the subtract and squaring circuit 115, 116 are switched by the control circuitry 132 in electronic switches 117, 118 to sample-and-hold circuits 119, 120, 121 and 122, according to whether the true or the reversed pattern is being compared, and these outputs are then summed by the integrators 123, 124, 125 and 126. Thus for each measurement of each colour, a comparison is made with a corresponding stored signal from each memory unit and on the basis of each possible orientation of the banknote. The electronic switches 117, 118 alternate in the same way that the comparisons are alternated between the true and the reversed patterns. Sample-and-hold amplifier 119 therefore stores the result of the comparison with the true pattern from memory 128, while sample-and-hold amplifier 120 stores the results of the comparisons with the reversed pattern of memory 128. Sample-and-hold amplifiers 121 and 122 store the corresponding results for the comparisons with the true and reversed patterns in memory 129. The outputs from the integrators are switched, by the control circuitry, sequentially to the square root circuit 131 at the end of the comparison. The output, which represents the square root of the sum of the squares of the differences of the sample and standard objects, is fed to the best match processor unit 130, for each of the banknotes and orientations sequentially. This processor compares these signals, which are in effect the standard deviations of the sample from the standard object, and selects the best match. In accordance with this best match, data for either rejecting the banknote or for diverting it to one or more destinations, is then fed to the object's transport system so that its progress can be suitably controlled.

The number of memory units 128, 129 for storing data for standard banknotes can be increased, together with the associated subtract and square circuits, sample-and-hold amplifiers and so on. The "best match" from all the standard banknotes, taken at either orientation, can then be obtained in an analogous manner.

In the embodiments of the invention described above, a banknote is scanned by means of visible light reflected from its surface. Other embodiments of the invention, however, are envisioned, in which light transmitted through a sheet is detected by a strip scanner. Moreover, the spectrum of light used does not have to be in the visible region; for the scanning of watermarks in a banknote, for example, it may be preferable to use ultraviolet light. The wavelength of the light source may be chosen to enhance differences in the waveforms of the patterns of banknote types that, are similar in white light.

In any of the embodiments described above, the means for illuminating the strip of the banknote should preferably be such that the width of the illustrated strip of note can be altered. This enables the waveform that is characteristic of a particular note to be altered simply by changing the resolution of the sensor head and is particularly useful where one type of banknote is to be identified from others having similar designs.

A variable resolution can be achieved by using an illumination fibre optic fishtail constructed of fibres with a large numerical aperture. The divergence of the output beam, which determines the resolution of the head, is controlled by collimating to a greater or lesser extent the input light source to the fibres. (The divergence of the input beam to a fibre determines the divergence of the output beam from the fibre, within the confines of the numerical aperture of the fibre).

We claim:

1. Apparatus for scanning a sheet printed with a pattern comprising:
   - means defining a flow path for the sheet;
   - means for illuminating at least a part of the flow path;
   - means for moving the sheet along the flow path;
   - means for collecting light from an illuminated strip of a sheet passing along the flow path, the strip being substantially perpendicular to the direction of movement of the sheet and extending, in said perpendicular direction, beyond the lateral borders of the surface of the sheet as it travels along the flow path;
   - photoelectric means receiving the whole of the light collected from the illuminated strip and generating, at any instant, a single intensity signal representing the intensity of the whole of the collected light; and
   - analysing means responsive to successive ones of generated intensity signals to create a waveform which is characteristic of the surface of the sheet.

2. Apparatus in accordance with claim 1, comprising a memory for storing the characteristic waveform of a sheet for subsequent comparison with another sheet, wherein the apparatus works in two alternative modes, a first mode being for recording the waveform in the memory, and a second mode being for comparing a currently-produced waveform with a stored waveform.

3. Apparatus according to claim 2, wherein the apparatus when in the compare mode makes a simultaneous comparison of the currently-produced waveform with a reversed stored waveform corresponding to the opposite orientation of the sheet.

4. Apparatus in accordance with claim 1, further including a circuit for determining the mean level of the successive intensity signals, and comparing each successive intensity signal with the mean level, the differences between the signal level and the mean level then being processed so as to provide a signal representing the standard deviation of the successive intensity signals from the mean.

5. Apparatus in accordance with claim 1, wherein the illuminating means consists of a fibre optic fishtail array, the wide end of which is arranged adjacent to the flow path to illuminate the strip, and wherein the means for collecting light from the strip comprises a single photodetector and a further fibre optic fishtail array, the wide end of which is arranged adjacent to the strip and the narrow end of which delivers light to the photodetector.

6. Apparatus as defined in claim 1 in which the
photoelectric means provides a set of colour intensity signals, each representative of the intensity of a different group of wavelengths of the collected light;
an analysing means responsive to successive colour intensity signals to create waveforms for each colour, the waveforms being characteristic of the surface of the sheet.

7. Apparatus in accordance with claim 6, comprising a memory for storing the characteristic colour waveforms of a plurality of sheets for subsequent comparison with respective waveforms of another sheet, wherein the apparatus works in two alternative modes, the first mode being for recording the wave forms for the plurality of sheets in the memory, and the second mode being for comparing currently-produced waveforms with stored waveforms, to determine the stored waveform which produces the best match.

8. Apparatus in accordance with claim 6, comprising a plurality of photodetectors responsive to the different wavelengths of light, each photodetector arranged to receive light from the said collecting means, wherein the analysing means takes successive intensity signals from each photodetector in rotation, so that the intensity value for any given wavelength is sampled periodically during the passage of the sheet along the flow path.

9. Apparatus according to claim 8, including means for normalizing the length of the characteristic waveform of each colour separately, to ensure that regions of a scanned banknote are compared with corresponding regions of a standard banknote, on the basis of the same group of wavelengths.

10. Apparatus for scanning a sheet printed with a pattern, comprising:
means defining a flow path for the sheet;
means for illuminating at least a part of the flow path;
means for moving the sheet along the flow path;
means for collecting light from two illuminated strips on the surface of the sheet as the sheet is moved along the flow path, the strips being substantially perpendicular to the direction of movement of the sheet, the two strips being parallel to and separate from each other;
photoelectric means responsive to the whole of the light collected from each strip to produce, at any instant, two corresponding intensity signals each having a value representing the intensity of the corresponding whole of collected light;
means responsive to successive intensity signals corresponding to each strip to derive two corresponding characteristic waveforms; and
means comparing each waveform both with a stored reference waveform and with the stored reference waveform reversed in time.

11. Apparatus in accordance with claim 10, wherein the two illuminated strips are of equal width and are equidistant from the centre of the sheet, so that changing the orientation of the sheet simply results in the same two strips being scanned in reverse, resulting in the two corresponding waveforms being interchanged and reversed.

* * * * *